(12) United States Patent
McCune et al.

(10) Patent No.: US 8,753,243 B2
(45) Date of Patent: Jun. 17, 2014

(54) RING GEAR MOUNTING ARRANGEMENT WITH OIL SCAVENGE SCHEME

(75) Inventors: Michael E. McCune, Colchester, CT (US); Lawrence E. Portlock, Bethany, CT (US)

(73) Assignee: United Technologies Corporation, Hartford, CT (US)

( * ) Notice: Subject to any disclaimer, the term of this patent is extended or adjusted under 35 U.S.C. 154(b) by 2453 days.

(21) Appl. No.: 11/504,220

(22) Filed: Aug. 15, 2006

(65) Prior Publication Data
US 2008/0044276 A1  Feb. 21, 2008

(51) Int. Cl.
*F16H 57/08* (2006.01)

(52) U.S. Cl.
USPC .............................. 475/331; 475/159; 475/160

(58) Field of Classification Search
USPC ...................... 475/159, 331, 160; 74/467, 468
See application file for complete search history.

(56) References Cited

U.S. PATENT DOCUMENTS

| | | | |
|---|---|---|---|
| 2,684,591 A * | 7/1954 | Lundquist | 73/862.31 |
| 3,160,026 A * | 12/1964 | Rosen | 74/410 |
| 3,352,178 A * | 11/1967 | Lindgren et al. | 475/343 |
| 3,722,323 A | 3/1973 | Welch | |
| 4,583,413 A * | 4/1986 | Lack | 74/410 |
| 4,896,499 A | 1/1990 | Rice | |
| 5,081,832 A | 1/1992 | Mowill | |
| 5,211,541 A | 5/1993 | Fledderjohn et al. | |
| 5,302,031 A | 4/1994 | Yuasa | |
| 5,391,125 A | 2/1995 | Turra et al. | |
| 5,433,674 A * | 7/1995 | Sheridan et al. | 475/346 |
| 5,466,198 A * | 11/1995 | McKibbin et al. | 475/346 |
| 5,472,383 A * | 12/1995 | McKibbin | 475/159 |
| 6,223,616 B1 * | 5/2001 | Sheridan | 74/468 |
| 6,402,654 B1 * | 6/2002 | Lanzon et al. | 475/204 |
| 6,530,858 B1 | 3/2003 | Uroso et al. | |
| 6,669,597 B1 | 12/2003 | Uroso et al. | |
| 6,732,502 B2 | 5/2004 | Seda et al. | |
| 7,021,042 B2 | 4/2006 | Law | |
| 7,591,754 B2 * | 9/2009 | Duong et al. | 475/347 |
| 7,662,059 B2 * | 2/2010 | McCune | 475/159 |
| 7,704,178 B2 * | 4/2010 | Sheridan et al. | 475/159 |
| 8,074,440 B2 | 12/2011 | Kohlenberg | |
| 2002/0064327 A1 | 5/2002 | Toda et al. | |

(Continued)

FOREIGN PATENT DOCUMENTS

| EP | 1114949 | 7/2001 |
|---|---|---|
| EP | 1 876 338 A2 | 1/2008 |

(Continued)

OTHER PUBLICATIONS

European Search Report for EP Application No. 07253078.5, Dec. 5, 2007.

(Continued)

*Primary Examiner* — Derek D Knight
(74) *Attorney, Agent, or Firm* — Carlson, Gaskey & Olds, P.C.

(57) ABSTRACT

A turbine engine includes an epicyclic gear train that has a two-piece ring gear. Each portion of the ring gear includes radially outwardly extending flanges that are axially constrained to a turbo fan shaft by bolts secured circumferentially along the flanges. Knife edge seals are secured to the flanges to contain oil expelled through the ring gear into a gutter. The ring gear and turbo fan shaft can be rotationally balanced together.

23 Claims, 2 Drawing Sheets

(56) References Cited

U.S. PATENT DOCUMENTS

| | | |
|---|---|---|
| 2004/0112041 A1 | 6/2004 | Law |
| 2005/0026745 A1 | 2/2005 | Mitrovic |
| 2008/0006018 A1* | 1/2008 | Sheridan et al. ............... 60/39.1 |
| 2008/0044276 A1* | 2/2008 | McCune et al. ........... 415/122.1 |
| 2008/0116009 A1* | 5/2008 | Sheridan et al. ............... 184/6.4 |
| 2009/0056306 A1 | 3/2009 | Suciu et al. |
| 2009/0081039 A1 | 3/2009 | McCune et al. |
| 2009/0090096 A1 | 4/2009 | Sheridan |
| 2009/0293278 A1* | 12/2009 | Duong et al. ................ 29/893.1 |
| 2009/0298640 A1* | 12/2009 | Duong et al. ................ 475/347 |
| 2011/0130246 A1 | 6/2011 | McCune |

FOREIGN PATENT DOCUMENTS

| | | |
|---|---|---|
| EP | 2224100 | 9/2010 |
| FR | 1 357 038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

Japanese Office Action for Japanese Application No. 2007-202444, Aug. 3, 2010.

European Search Report and Written Opinion for European Application No. EP 12 19 8136 completed on Aug. 21, 2013.

International Search Report and Written Opinion for International Application No. PCT/US2012/071906 completed on Aug. 22, 2013.

Dudley ("Gear Handbook: The design, Manufacture, and Application of Gears", p. 3-15).

* cited by examiner

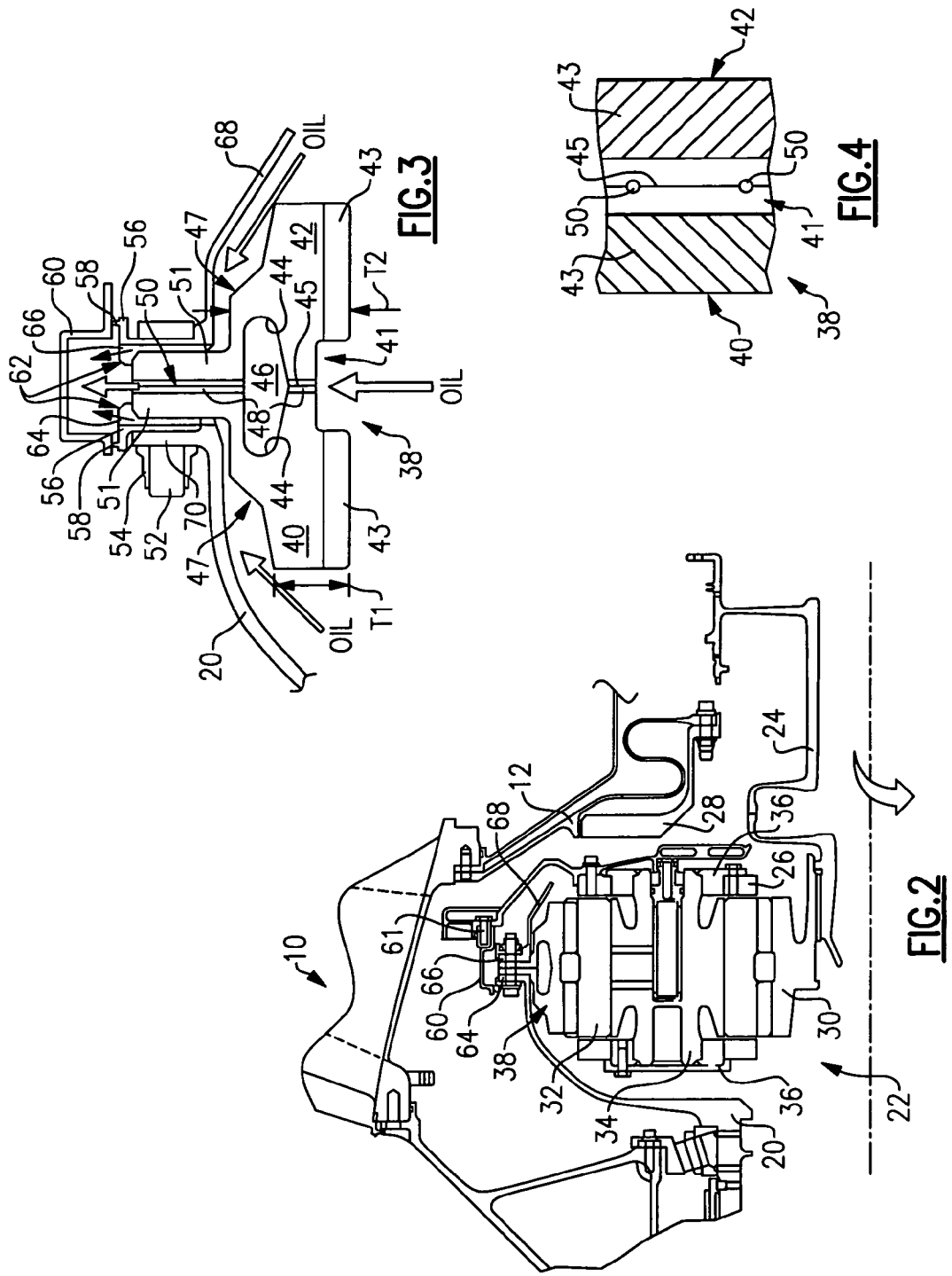

RING GEAR MOUNTING ARRANGEMENT WITH OIL SCAVENGE SCHEME

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A gas turbine engine includes an epicyclic gear train that drives a turbo fan. The epicyclic gear train includes a carrier that is fixed relative to a housing of the turbine engine. The carrier supports star gears that mesh with a sun gear coupled to an input shaft. A two-piece ring gear surrounds and meshes with the star gears. The ring gear includes first and second portions that are directly secured to a turbo fan shaft using circumferentially arranged bolts. The ring gear and turbo fan shaft can be reliably rotationally balanced with one another. The first and second portions are shaped to provide desired stiffness and resistance to overturning moments.

The first and second portions and turbo fan shaft include radially outwardly extending flanges that are secured to one another by the bolts, which axially constrain the turbo fan shaft and ring gear relative to one another. The splined ring is eliminated. Knife edge seals are secured to the flanges and contain oil expelled through the ring gear and radial grooves in the seals within a gutter.

These and other features of the present invention can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION OF THE PREFERRED EMBODIMENT

Figure 1:
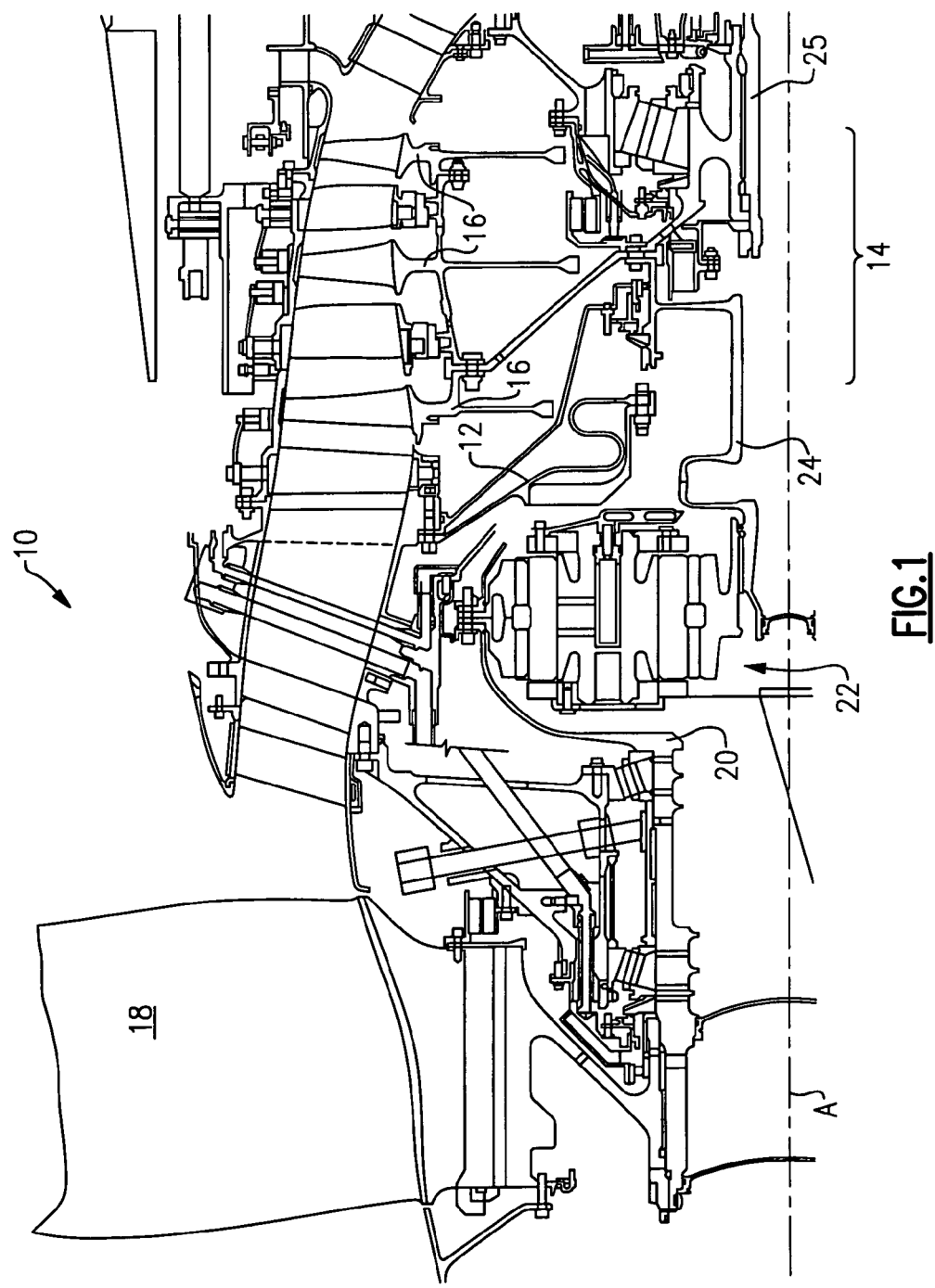
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gear support assembly for a turbine engine, comprising:
   an epicyclic gear arrangement;
   a first tapered bearing and a second tapered bearing spaced apart from the first tapered bearing, the first tapered bearing and the second tapered bearing being arranged axially forward of the epicyclic gear arrangement and supporting the epicyclic gear arrangement, wherein the first tapered bearing includes a first roller element defining a first rotational axis and the second tapered bearing includes a second roller element defining a second rotational axis such that the first rotational axis and the second rotational axis intersect at a position that is radially inwards from the first roller element and the second roller element.

2. The gear support assembly as recited in claim 1, wherein the first tapered bearing and the second tapered bearing are located radially inwards from a radially outer surface of the epicyclic gear arrangement.

3. The gear support assembly as recited in claim 1, wherein the first tapered bearing and the second tapered bearing are located radially outwards of a radially inner surface of the epicyclic gear arrangement.

4. The gear support assembly as recited in claim 1, including a support arm extending forward from the epicyclic gear arrangement, at least one of the first tapered bearing and the second tapered bearing being mounted on the support arm.

5. The gear support assembly as recited in claim 4, wherein the support arm is connected at one end at a radially outer location of the epicyclic gear arrangement.

6. The gear support assembly as recited in claim 1, wherein at least one of the first tapered bearing and the second tapered bearing includes a cylindrical roller element.

7. The gear support assembly as recited in claim 6, wherein the cylindrical roller element is supported on a tapered race.

8. The gear support assembly as recited in claim 1, wherein the first tapered bearing and the second tapered bearing are spaced an equivalent radial distance from a central axis of the epicyclic gear arrangement.

9. The gear support assembly as recited in claim 1, wherein the position at which the first rotational axis and the second rotational axis intersect is radially inwards from tapered inner races that support the first roller element and the second roller element.

10. The gear support assembly as recited in claim 1, wherein the epicyclic gear arrangement includes a carrier supporting star gears that mesh with a sun gear, and a ring gear surrounding and meshing with the star gears, each of the star gears being supported on a respective journal bearing, the ring gear including first and second portions that abut at a radial interface, the first and second portions including an S-shaped outer circumferential surface.

11. The gear support assembly as recited in claim 10, wherein the first and second portions have a first thickness T1 that is less than a second thickness T2 arranged axially inwardly from the first thickness T1.

12. A turbine engine comprising:
    a compressor section;
    a combustor arranged in fluid receiving communication with the compressor section;
    a turbine section arranged in fluid receiving communication with the combustor;
    an epicyclic gear arrangement coupled to be driven by the turbine section; and
    a first tapered bearing and a second tapered bearing spaced apart from the first tapered bearing, the first tapered bearing and the second tapered bearing being arranged axially forward of the epicyclic gear arrangement and supporting the epicyclic gear arrangement.

13. The turbine engine as recited in claim 12, including a fan located axially forward of the compressor section, wherein a forward one of the first tapered bearing and the second tapered bearing is located at an equivalent axial position of the fan.

14. The turbine engine as recited in claim 12, including a fan located axially forward of the compressor section, wherein a forward one of the first tapered bearing and the second tapered bearing is located at an equivalent axial position of the fan and a rear one of the first tapered bearing and the second tapered bearing is located at a non-equivalent axial position of the fan.

15. The turbine engine as recited in claim 12, wherein the first tapered bearing and the second tapered bearing are located radially inwards from a radially outer surface of the epicyclic gear arrangement.

16. The turbine engine as recited in claim 12, including a support arm extending forward from the epicyclic gear arrangement, at least one of the first tapered bearing and the second tapered bearing being mounted on the support arm.

17. The turbine engine as recited in claim 16, wherein the support arm is connected at one end at a radially outer location of the epicyclic gear arrangement.

18. The turbine engine as recited in claim 12, wherein at least one of the first tapered bearing and the second tapered bearing includes a second cylindrical roller element.

19. The turbine engine as recited in claim 18, wherein the cylindrical roller element is supported on a tapered race.

20. The turbine engine as recited in claim 12, wherein the first tapered bearing and the second tapered bearing are spaced an equivalent radial distance from a central axis of the epicyclic gear arrangement.

21. The turbine engine as recited in claim 12, wherein the first tapered bearing includes a first roller element defining a first rotational axis and the second tapered bearing includes a second roller element defining a second rotational axis such that the first rotational axis and the second rotational axis intersect at a position that is radially inwards from the first roller element and the second roller element.

22. The turbine engine as recited in claim 12, wherein the epicyclic gear arrangement includes a carrier supporting star gears that mesh with a sun gear, and a ring gear surrounding and meshing with the star gears, each of the star gears being supported on a respective journal bearing, the ring gear including first and second portions that abut at a radial interface, the first and second portions including an S-shaped outer circumferential surface.

23. The turbine engine as recited in claim 22, wherein the first and second portions have a first thickness T1 that is less than a second thickness T2 arranged axially inwardly from the first thickness T1.

* * * * *

UNITED STATES PATENT AND TRADEMARK OFFICE
CERTIFICATE OF CORRECTION

Page 1 of 2

PATENT NO. : 8,753,243 B2
APPLICATION NO. : 11/504220
DATED : June 17, 2014
INVENTOR(S) : McCune et al.

It is certified that error appears in the above-identified patent and that said Letters Patent is hereby corrected as shown below:

On the Title page delete 23 claims and insert 6 claims.

IN THE CLAIMS:

Delete claims 1-23;

Insert

Column 3, lines 16-23, Claim 1.
--1. An epicyclic gear train for a turbine engine comprising:
a shaft rotatable about an axis;
a ring gear including first and second portions each having an inner periphery with teeth, the first and second portions secured to one another at a radial interface, and at least one of the first and second portions including a flange extending radially outward, the flange fixed to the shaft in an axial direction by a fastening element; and
a carrier supporting star gears that mesh with the ring gear, and a sun gear meshing with the star gears and coupled to an output shaft.--
Column 3, lines 24-27, Claim 2.
--2. The epicyclic gear train according to claim 1, wherein the teeth on the first portion are angled in a first direction, and the teeth on the second portion are angled in a second direction opposite the first direction, a rotational direction of the ring gear forcing the first and second portions toward one another at the radial interface.--
Column 3, lines 29-31, Claim 3.
--3. The epicyclic gear train according to claim 1, the first and second portions each have a generally S-shaped outer circumferential surface opposite the teeth that provide a first thickness and a second thickness axially inward from the first thickness, the second thickness greater than the first thickness.--

Signed and Sealed this
Fifteenth Day of December, 2015

Michelle K. Lee
*Director of the United States Patent and Trademark Office*

Column 3, lines 36-37, Claim 5.
--5. The epicyclic gear train according to claim 1, wherein the flange and the teeth of the at least one of the first and second portions provide a unitary structure.--
Column 3, lines 38-44, Claim 6.
--6. An epicyclic gear train for a turbine engine comprising:
a shaft rotatable about an axis; and
a ring gear including first and second portions each having an inner periphery with teeth, the first and second portions secured to one another at a radial interface, and at least one of the first and second portions including a flange extending radially outward, the flange fixed to the shaft in an axial direction by a fastening element, wherein the first and second portions each include the flange, and the shaft includes a radially extending flange, the flanges secured to one another by the fastening element.--
Column 3, lines 48-53, Claim 8.
--8. An epicyclic gear train for a turbine engine comprising:
a shaft rotatable about an axis;
a ring gear including first and second portions each having an inner periphery with teeth, the first and second portions secured to one another at a radial interface, and at least one of the first and second portions including a flange extending radially outward, the flange fixed to the shaft in an axial direction by a fastening element; and a pair of spaced apart seals secured to the ring gear and shaft by the fastening element.--